US012212031B2

(12) United States Patent
Ge et al.

(10) Patent No.: US 12,212,031 B2
(45) Date of Patent: Jan. 28, 2025

(54) CAVITY FILTER

(71) Applicant: Suzhou Luxshare Technology Co., Ltd., Suzhou (CN)

(72) Inventors: Wen Ge, Suzhou (CN); Wei Wang, Suzhou (CN); XingHua Sun, Suzhou (CN)

(73) Assignee: SUZHOU LUXSHARE TECHNOLOGY CO., LTD., Suzhou (CN)

( * ) Notice: Subject to any disclaimer, the term of this patent is extended or adjusted under 35 U.S.C. 154(b) by 280 days.

(21) Appl. No.: 17/969,169

(22) Filed: Oct. 19, 2022

(65) Prior Publication Data

US 2023/0130667 A1 Apr. 27, 2023

(30) Foreign Application Priority Data

Oct. 21, 2021 (CN) ......................... 202122534030.9

(51) Int. Cl.
*H01P 1/207* (2006.01)

(52) U.S. Cl.
CPC .................................... *H01P 1/207* (2013.01)

(58) Field of Classification Search
CPC ....... H01L 2924/19105; H01L 21/4857; H01L 2924/00014; H01L 2224/0401; H01L 2224/48227; H01L 25/0652; H01L 27/08; H01L 2924/00; H01L 2924/01019; H01L 2924/01078; H01L 2924/01079; H01L 2924/15311; H01L 2924/19041; H01L 2924/3011; H01L 2924/3025; H01P 1/20381; H01P 1/20; H01P 7/00; H01P 1/203; H01P 1/205; H01P 1/20345; H01P 7/082; H01P 1/207; H03H 2001/0085; H03H 7/1775; H03H 7/09; H03H 7/0115; H03H 7/0123; H03H 2001/0078; H03H 7/1766; H03H 7/38; H01F 17/0013; H01F 41/041; H01F 17/0033; H01F 27/292; H01F 17/0006; H01F 2017/0026;
(Continued)

(56) References Cited

U.S. PATENT DOCUMENTS

| | | | | |
|---|---|---|---|---|
| 5,955,931 A * | 9/1999 | Kaneko | ................ | H03H 7/1725 333/175 |
| 2019/0280358 A1* | 9/2019 | Zhang | ..................... | H01P 1/207 |

* cited by examiner

*Primary Examiner* — Lincoln D Donovan
*Assistant Examiner* — Tyler J Pereny
(74) *Attorney, Agent, or Firm* — Birch, Stewart, Kolasch & Birch, LLP

(57) ABSTRACT

Disclosed is a cavity filter including a housing, and a first sheet-shaped resonant rod, a second sheet-shaped resonant rod, and a third sheet-shaped resonant rod disposed in the housing. The first sheet-shaped resonant rod includes a first upright section and a first extension section extending from one side of the first upright section. The second sheet-shaped resonant rod includes a second upright section and a second extension section extending from one side of the second upright section. The second upright section, the first upright section, and the third sheet-shaped resonant rod are connected to the housing, and the first extension section and the second extension section extend toward each other. Capacitive coupling is formed between the first and second sheet-shaped resonant rods. Capacitive coupling or inductive coupling is formed between the second and third sheet-shaped resonant rods and between the first and third sheet-shaped resonant rods.

15 Claims, 9 Drawing Sheets

(58) Field of Classification Search
CPC .. H01F 2017/0093; H05K 1/165; H05K 1/00; H05K 1/162; H05K 1/167; H05K 3/4688
See application file for complete search history.

CAVITY FILTER

CROSS REFERENCE TO RELATED APPLICATION

This application claims the priority benefit of Chinese Patent Application Serial Number 202122534030.9, filed on Oct. 21, 2021, the full disclosure of which is incorporated herein by reference.

BACKGROUND

Technical Field

The present disclosure relates to the technical field of filter technology, and in particular to a cavity filter.

Related Art

The cavity filter is a microwave filter with a resonant cavity structure, which is used to select the frequency of the communication signal and filter out the clutter or interference signal outside the frequency of the communication signal. In the cavity filter, a flying rod is often used to realize the signal coupling between the resonant rods of two adjacent cavities, and the flying rod is installed on a flying rod seat. The amount of capacitive coupling between the resonant rods of two adjacent cavities is adjusted by changing the length and size of the flying rod, thereby changing the strength of the transmission zero on the left (the low-frequency side) of the transmission passband of the cavity filter.

However, there are problems of increased cavity materials, complicated assembly and high cost due to the need to use the flying rod to generate the transmission zero on the low-frequency side of the passband, and the problem that the consistency of the transmission zero is poor due to the poor consistency of the flying rod.

In view of this, how to develop a resonant filter that can generate the transmission zero on the low-frequency side of the passband without using the flying rod and is easy to assemble is an urgent problem for those skilled in the art.

SUMMARY

The present disclosure provides a cavity filter, which can effectively solve the problems of increased cavity materials, complicated assembly and high cost due to the need to use the flying rod to generate the transmission zero on the low-frequency side of the passband, and the problem that the consistency of the transmission zero is poor due to the poor consistency of the flying rod.

In order to solve the above technical problems, the present disclosure is implemented as follows.

The present disclosure provides a cavity filter, which includes a housing, a first sheet-shaped resonant rod, a second sheet-shaped resonant rod, and a third sheet-shaped resonant rod. The housing has an accommodating cavity. The first sheet-shaped resonant rod is disposed in the accommodating cavity and includes a first upright section and a first extension section extending from one side of the first upright section, and one end of the first upright section away from the first extension section is connected to the housing. The second sheet-shaped resonant rod is disposed in the accommodating cavity and includes a second upright section and a second extension section extending from one side of the second upright section, and one end of the second upright section away from the second extension section is connected to the housing. The first extension section and the second extension section extend toward each other. The third sheet-shaped resonant rod is disposed in the accommodating cavity and connected to the housing. Capacitive coupling is formed between the first sheet-shaped resonant rod and the second sheet-shaped resonant rod, and capacitive coupling or inductive coupling is formed between the second sheet-shaped resonant rod and the third sheet-shaped resonant rod and between the first sheet-shaped resonant rod and the third sheet-shaped resonant rod.

In the cavity filter of the embodiment of the present disclosure, the first extension section of the first sheet-shaped resonant rod and the second extension section of the second sheet-shaped resonant rod are opposite to each other, so that the capacitive coupling is formed between the first sheet-shaped resonant rod and the second sheet-shaped resonant rod (that is, the capacitive coupling can be realized without the flying rod). The capacitive coupling is formed between the first sheet-shaped resonant rod and the second sheet-shaped resonant rod, and the capacitive coupling or the inductive coupling is formed between the second sheet-shaped resonant rod and the third sheet-shaped resonant rod and between the first sheet-shaped resonant rod and the third sheet-shaped resonant rod, so that the symmetrical transmission zero is generated (that is, the transmission zero is generated on the low-frequency side of the passband). In addition, the cavity filter has the advantages of good stability, good consistency, simple manufacturing process, easy assembly, and low cost based on the design of the overall simple structure.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
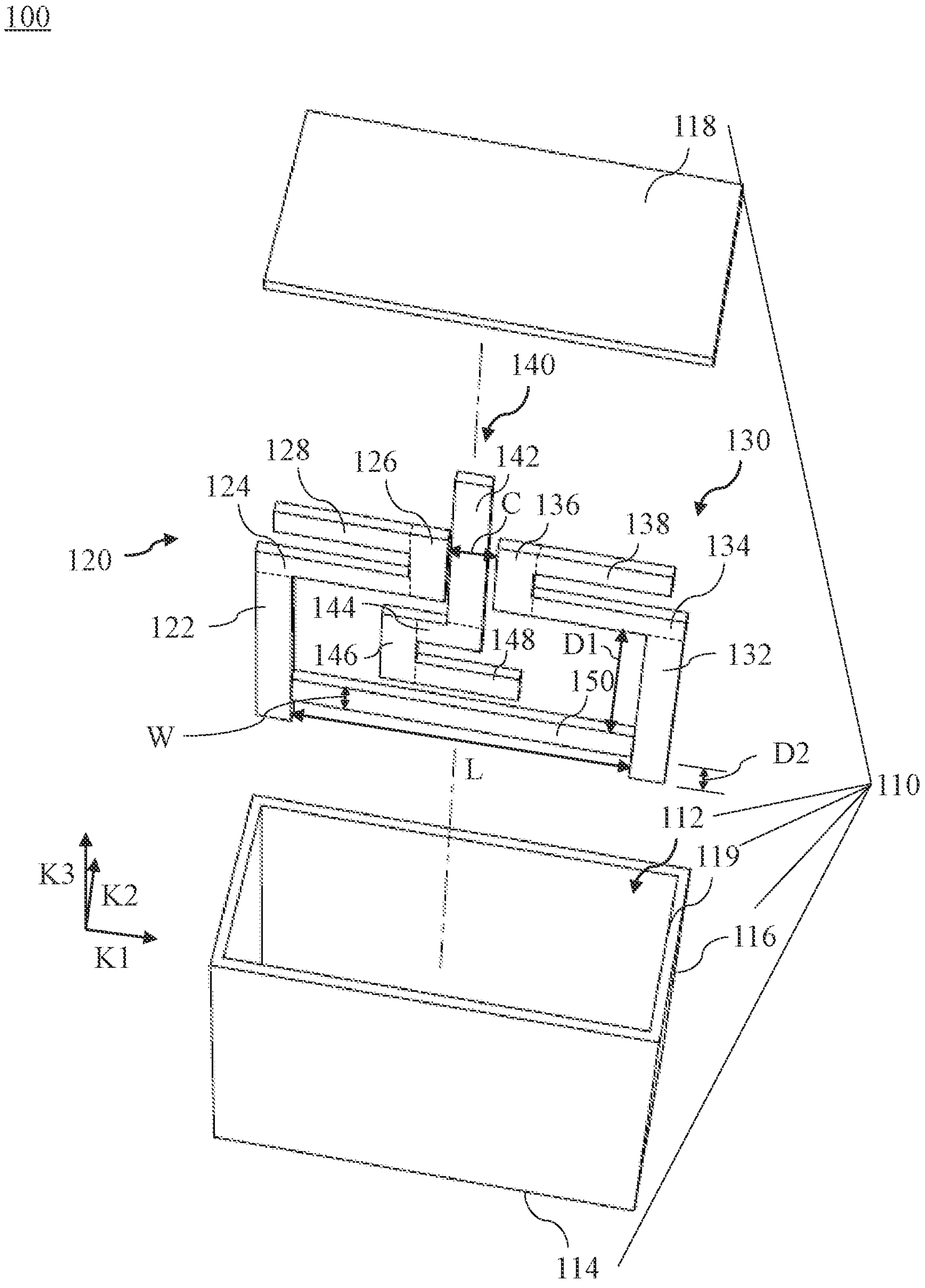
FIG. 1 is an exploded view of a cavity filter according to an embodiment of the present disclosure.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to".

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

It must be understood that when a component is described as being "connected" or "coupled" to (or with) another component, it may be directly connected or coupled to other components or through an intermediate component. In contrast, when a component is described as being "directly connected" or "directly coupled" to (or with) another component, there are no intermediate components. In addition, unless specifically stated in the specification, any term in the singular case also comprises the meaning of the plural case.

In the following embodiment, the same reference numerals are used to refer to the same or similar elements throughout the disclosure.

Figure 2:
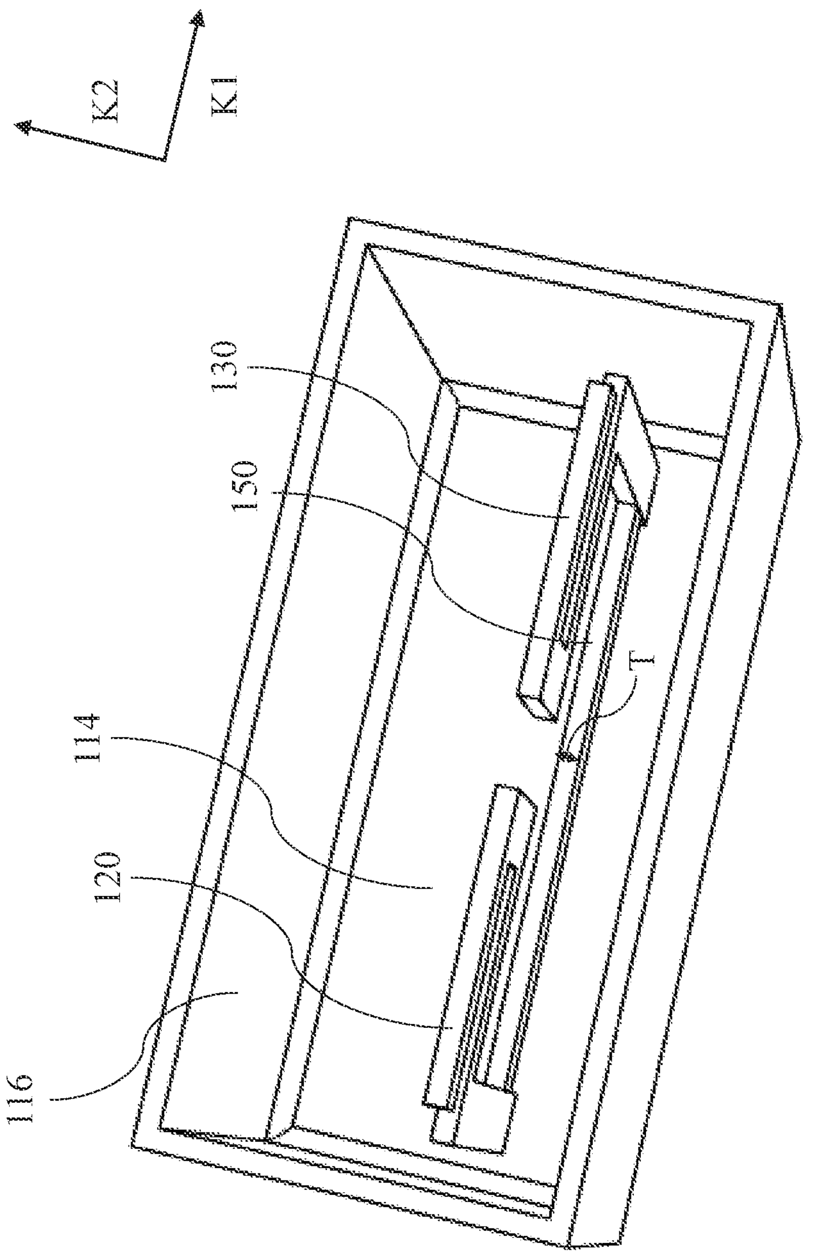
FIG. 2 is a combined view of an embodiment of the first sheet-shaped resonant rod, the second sheet-shaped resonant rod, and a part of the housing of FIG. 1.
Figure 3:
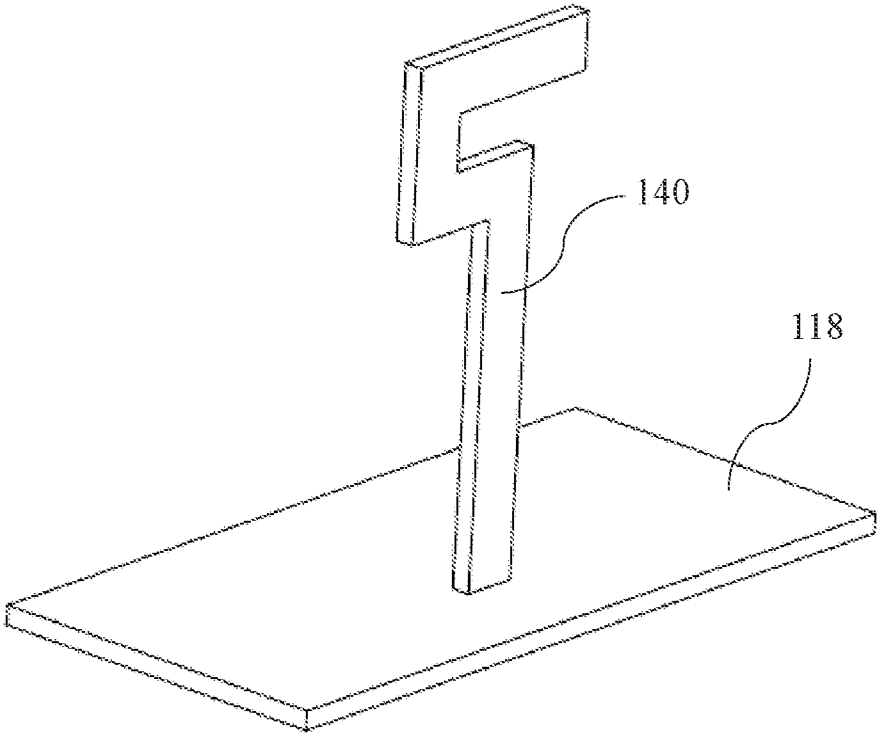
FIG. 3 is a combined view of an embodiment of the third sheet-shaped resonant rod and a part of the housing of FIG. 1.

Please refer to FIGS. 1 to 3, wherein FIG. 1 is an exploded view of a cavity filter according to an embodiment of the present disclosure, FIG. 2 is a combined view of an embodiment of the first sheet-shaped resonant rod, the second sheet-shaped resonant rod, and a part of the housing of FIG. 1, and FIG. 3 is a combined view of an embodiment of the third sheet-shaped resonant rod and a part of the housing of FIG. 1. As shown in FIGS. 1 to 3, in this embodiment, the cavity filter 100 comprises a housing 110, a first sheet-shaped resonant rod 120, a second sheet-shaped resonant rod 130, and a third sheet-shaped resonant rod 140. The housing 110 has an accommodating cavity 112. The first sheet-shaped resonant rod 120 is disposed in the accommodating cavity 112, and comprises a first upright section 122 and a first extension section 124 extending from one side of the first upright section 122, and one end of the first upright section 122 away from the first extension section 124 is connected to the housing 110. In some embodiments, the first upright section 122 is fixed to the housing 110. The second sheet-shaped resonant rod 130 is disposed in the accommodating cavity 112 and comprises a second upright section 132 and a second extension section 134 extending from one side of the second upright section 132, and one end of the second upright section 132 away from the second extension section 134 is connected to the housing 110, wherein the first extension section 124 and the second extension section 134 extend toward each other. In some embodiments, the second upright section 132 is fixed to the housing 110. The third sheet-shaped resonant rod 140 is disposed in the accommodating cavity 112 and connected to the housing 110. Capacitive coupling is formed between the first sheet-shaped resonant rod 120 and the second sheet-shaped resonant rod 130, and capacitive coupling or inductive coupling is formed between the second sheet-shaped resonant rod 130 and the third sheet-shaped resonant rod 140 and between the first sheet-shaped resonant rod 120 and the third sheet-shaped resonant rod 140. In some embodiments, third sheet-shaped resonant rod 140 is fixed to the housing 110.

That is to say, the first sheet-shaped resonant rod 120 and the second sheet-shaped resonant rod 130 form the capacitive coupling through the first extension section 124 and the second extension section 134 that are close to each other. The distance between the second sheet-shaped resonant rod 130 and the third sheet-shaped resonant rod 140 is controlled, so that the capacitive coupling or the inductive coupling is formed between the second sheet-shaped resonant rod 130 and the third sheet-shaped resonant rod 140. The distance between the first sheet-shaped resonant rod 120 and the third sheet-shaped resonant rod 140 is controlled, so that the capacitive coupling or the inductive coupling is formed between the first sheet-shaped resonant rod 120 and the third sheet-shaped resonant rod 140.

The shorter the separation distance C between the first extension section 124 and the second extension section 134, the greater the amount of the capacitive coupling between the first sheet-shaped resonant rod 120 and the second sheet-shaped resonant rod 130 (i.e., the smaller the amount of the inductive coupling between the first sheet-shaped resonant rod 120 and the second sheet-shaped resonant rod 130). On the contrary, the longer the separation distance C between the first extension section 124 and the second extension section 134, the smaller the capacitive coupling between the first sheet-shaped resonant rod 120 and the second sheet-shaped resonant rod 130 (i.e., the greater the amount of the inductive coupling between the first sheet-shaped resonant rod 120 and the second sheet-shaped resonant rod 130). That is, the separation distance C between the first extension section 124 and the second extension section 134 corresponds to the amount of the capacitive coupling between the first sheet-shaped resonant rod 120 and the second sheet-shaped resonant rod 130.

The closer the distance between the second sheet-shaped resonant rod 130 and the third sheet-shaped resonant rod 140, the greater the amount of the capacitive coupling between the second sheet-shaped resonant rod 130 and the third sheet-shaped resonant rod 140 (i.e., the smaller the amount of the inductive coupling between the second sheet-shaped resonant rod 130 and the third sheet-shaped resonant rod 140). On the contrary, the farther the distance between the second sheet-shaped resonant rod 130 and the third sheet-shaped resonant rod 140, the smaller the amount of the capacitive coupling between the second sheet-shaped resonant rod 130 and the third sheet-shaped resonant rod 140 (i.e., the greater the amount of the inductive coupling between the second sheet-shaped resonant rod 130 and the third sheet-shaped resonant rod 140).

The closer the distance between the first sheet-shaped resonant rod 120 and the third sheet-shaped resonant rod 140, the greater the amount of the capacitive coupling between the first sheet-shaped resonant rod 120 and the third sheet-shaped resonant rod 140 (i.e., the smaller the amount of the inductive coupling between the first sheet-shaped resonant rod 120 and the third sheet-shaped resonant rod 140). On the contrary, the farther the distance between the first sheet-shaped resonant rod 120 and the third sheet-shaped resonant rod 140, the smaller the amount of the capacitive coupling between the first sheet-shaped resonant rod 120 and the third sheet-shaped resonant rod 140 (i.e., the greater the amount of the inductive coupling between the first sheet-shaped resonant rod 120 and the third sheet-shaped resonant rod 140).

According to the cross coupling theory, when the capacitive coupling is formed between the first sheet-shaped resonant rod 120 and the second sheet-shaped resonant rod 130, between the second sheet-shaped resonant rod 130 and the third sheet-shaped resonant rod 140, and between the first sheet-shaped resonant rod 120 and the third sheet-shaped resonant rod 140; or when the capacitive coupling is formed between the first sheet-shaped resonant rod 120 and the second sheet-shaped resonant rod 130, and the inductive coupling is formed between the second sheet-shaped resonant rod 130 and the third sheet-shaped resonant rod 140 and between the first sheet-shaped resonant rod 120 and the third sheet-shaped resonant rod 140, the cavity filter 100 can generate a transmission zero on the low-frequency side of the passband.

In an embodiment, the first sheet-shaped resonant rod 120, the second sheet-shaped resonant rod 130, and the third sheet-shaped resonant rod 140 are all sheets with metal surfaces or metal sheets. When the first sheet-shaped resonant rod 120, the second sheet-shaped resonant rod 130, and the third sheet-shaped resonant rod 140 are metal sheets, they can be made by directly cut and formed by the metal sheet. When the first sheet-shaped resonant rod 120, the second sheet-shaped resonant rod 130, and the third sheet-shaped resonant rod 140 are sheets with metal surfaces, they can be formed by electroplating after plastic injection molding.

Figure 4:
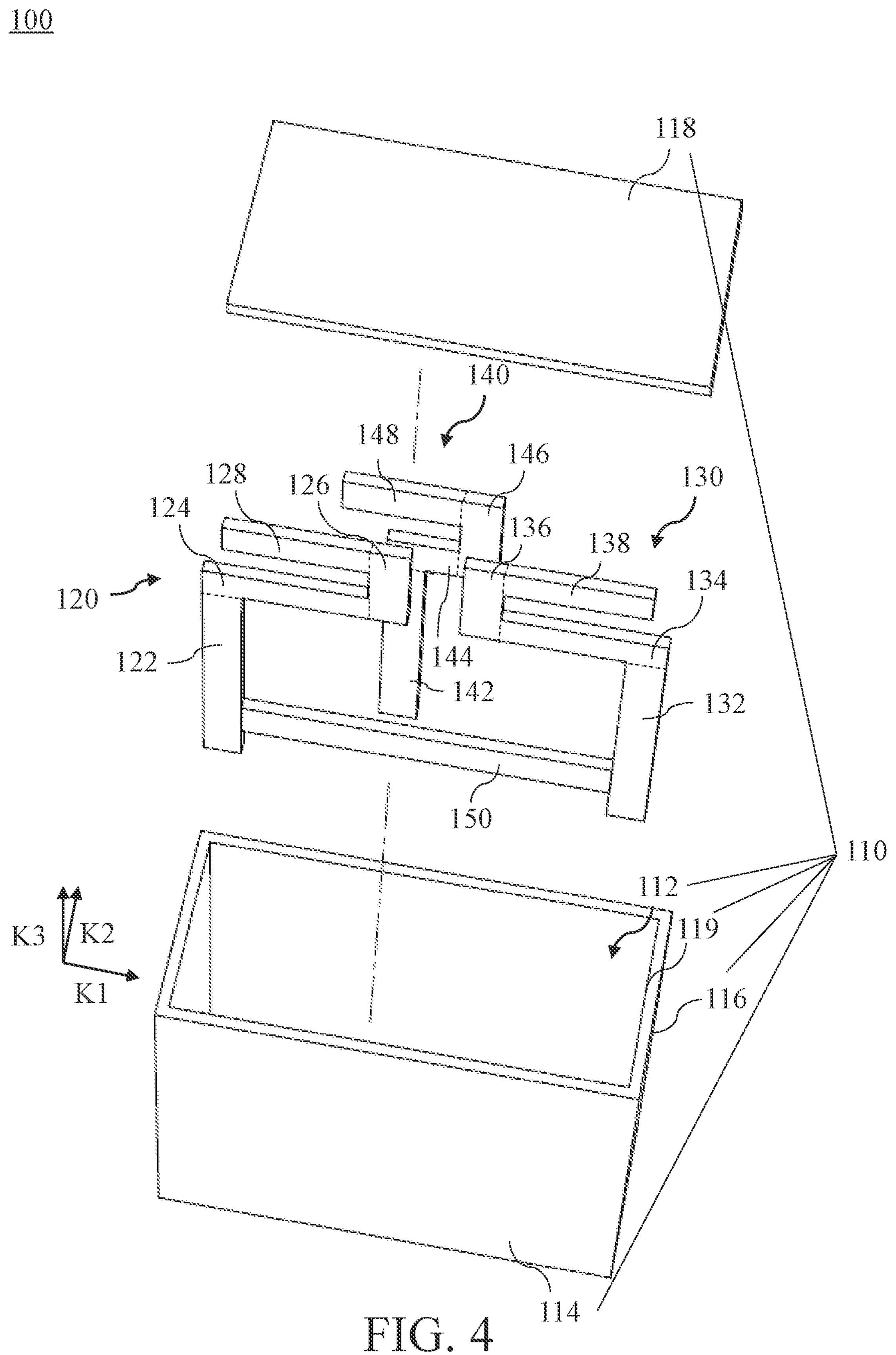
FIG. 4 is an exploded view of a cavity filter according to another embodiment of the present disclosure.
Figure 5:
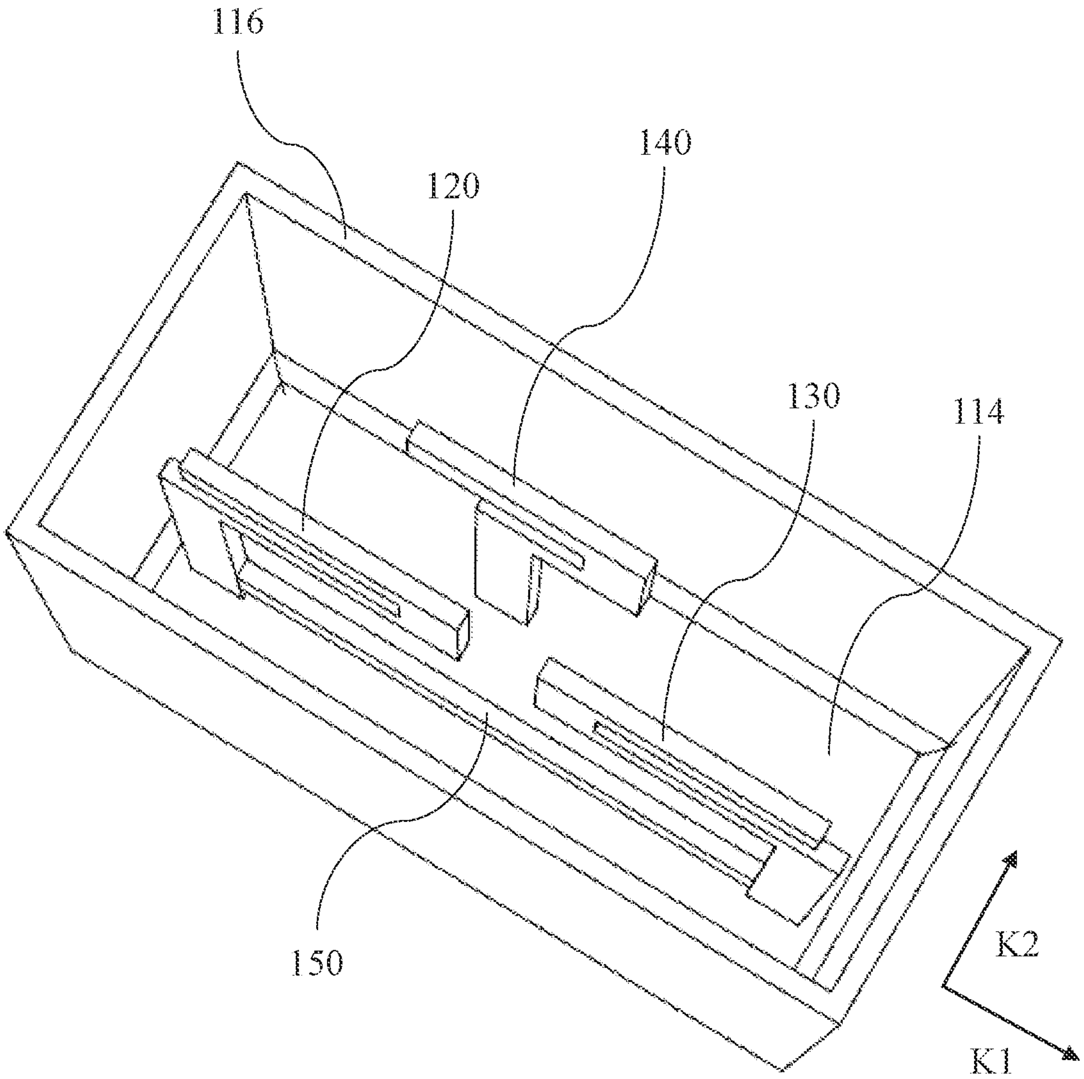
FIG. 5 is a combined view of an embodiment of the first sheet-shaped resonant rod, the second sheet-shaped resonant rod, the third sheet-shaped resonant rod, and a part of the housing of FIG. 1.

In an embodiment, the housing 110 further comprises a bottom plate portion 114, a side wall portion 116, and a cover plate portion 118. The side wall portion 116 is circumferentially connected to the bottom plate portion 114, the side wall portion 116 and the bottom plate portion 114 form the accommodating cavity 112 and an opening 119, and one side surface of the cover plate portion 118 covers the opening 119. In some embodiments, the cover plate portion 118 is fixed to the side wall portion 116. The first sheet-shaped resonant rod 120 and the second sheet-shaped resonant rod 130 are connected to the bottom plate portion 114, as shown in FIG. 2, and the third sheet-shaped resonator rod 140 is connected to the cover plate portion 118, as shown in FIG. 3. In some embodiments, the first sheet-shaped resonant rod 120 and the second sheet-shaped resonant rod 130 are fixed to the bottom plate portion 114. In some embodiments, third sheet-shaped resonant rod 140 is fixed to the cover plate portion 118. In another embodiment, the third sheet-shaped resonant rod 140 is connected to the bottom plate portion 114, as shown in FIGS. 4 and 5, wherein FIG. 4 is an exploded view of a cavity filter according to another embodiment of the present disclosure, and FIG. 5 is a combined view of an embodiment of the first sheet-shaped resonant rod, the second sheet-shaped resonant rod, the third sheet-shaped resonant rod, and a part of the housing of FIG. 1. In some embodiments, the third sheet-shaped resonant rod 140 is fixed to the bottom plate portion 114.

In one embodiment, the side wall portion 116 and the bottom plate portion 114 are integrally formed, that is, the side wall portion 116 and the bottom plate portion 114 can be directly formed by sheet metal bending or stretching mold, or formed by electroplating after aluminum alloy or magnesium alloy die-casting, or formed by electroplating after plastic injection molding, to achieve the advantages of low cost and light weight.

In an embodiment, the cover plate portion 118 can be directly processed and formed from a plate material, and the bottom plate portion 114 and the cover plate portion 118 are arranged parallel to each other.

In one embodiment, the first sheet-shaped resonant rod 120 and the second sheet-shaped resonant rod 130 are directly welded to the bottom plate portion 114, and the third sheet-shaped resonant rod 140 is directly welded to the cover plate portion 118 or the bottom plate portion 114. In another embodiment, the first sheet-shaped resonant rod 120, the second sheet-shaped resonant rod 130, and the third sheet-shaped resonant rod 140 are respectively provided with plug-in sections not drawn, and the first sheet-shaped resonant rod 120 and the second sheet-shaped resonant rod 130 are respectively inserted into the bottom plate portion 114 through the plug-in sections thereof, and the third sheet-shaped resonant rod 140 is inserted into the cover plate portion 118 or the bottom plate portion 114 through its plug-in section.

In an embodiment, the first sheet-shaped resonant rod 120 and the second sheet-shaped resonant rod 130 are spaced apart from each other in the first direction K1, the third sheet-shaped resonant rod 140 is disposed between the first sheet-shaped resonant rod 120 and the second sheet-shaped resonant rod 130 in the first direction K1, and the third sheet-shaped resonant rod 140 is spaced apart from the first sheet-shaped resonant rod 120 and the second sheet-shaped resonant rod 130 in the second direction K2 perpendicular to the first direction K1, as shown in FIGS. 1, 4 and 5.

In one embodiment, the third sheet-shaped resonant rod 140 and the first sheet-shaped resonant rod 120 partially overlap in the second direction K2, or the third sheet-shaped resonant rod 140 and the second sheet-shaped resonant rod 130 partially overlap in the second direction K2, as shown in FIGS. 1, 4, and 5. Therefore, the capacitive coupling or the inductive coupling may be formed between the second sheet-shaped resonant rod 130 and the third sheet-shaped resonant rod 140 and between the first sheet-shaped resonant rod 120 and the third sheet-shaped resonant rod 140.

In an embodiment, referring to FIGS. 1 to 3, the cavity filter 100 further comprises a connecting rib 150 that connects the first upright section 122 and the second upright section 132 along the first direction K1, the connecting rib 150 is parallel to the first extension section 124 and the second extension section 134, and the connecting rib 150 is spaced apart from the first extension section 124 and the second extension section 134 along a third direction K3 perpendicular to the first direction K1. The connecting rib 150 may be a sheet with a metal surface or a metal sheet.

In an embodiment, the first sheet-shaped resonant rod 120, the second sheet-shaped resonant rod 130 and the connecting rib 150 are integrally formed.

In an embodiment, the connecting rib 150 has a length L in the first direction K1, a thickness T in the third direction K3, and a width W in a second direction K2 perpendicular to the first direction K1 and the third direction K3, and the length L, the thickness T and the width W correspond to the amount of the capacitive coupling between the first sheet-shaped resonant rod 120 and the second sheet-shaped resonant rod 130. The longer the length L of the connecting rib 150, the thicker the thickness T of the connecting rib 150 and/or the greater the width W of the connecting rib 150, the smaller the amount of the capacitive coupling between the first sheet-shaped resonant rod 120 and the second sheet-shaped resonant rod 130 (i.e., the greater the amount of the inductive coupling between the first sheet-shaped resonant rod 120 and the second sheet-shaped resonant rod 130). Conversely, the shorter the length L of the connecting rib 150, the thinner the thickness T of the connecting rib 150, and/or the smaller the width W of the connecting rib 150, the greater the amount of the capacitive coupling between the first sheet-shaped resonant rod 120 and the second sheet-shaped resonant rod 130 (i.e., the smaller the amount of the inductive coupling between the first sheet-shaped resonant rod 120 and the second sheet-shaped resonant rod 130).

In an embodiment, the separation distance D1 between the connecting rib 150 and the first extension 124 or the second extension 134 in the third direction K3 corresponds to the amount of the capacitive coupling between the first sheet-shaped resonant rod 120 and the second sheet-shaped resonant rod 130. The shorter the separation distance D1, the smaller the amount of the capacitive coupling; on the contrary, the longer the separation distance D1, the greater the amount of the capacitive coupling. In other words, the longer the distance D2 between the connecting rib 150 and the bottom plate portion 114 in the third direction K3, the smaller the amount of the capacitive coupling between the first sheet-shaped resonant rod 120 and the second sheet-shaped resonant rod 130 (i.e., the greater the amount of the inductive coupling between the first sheet-shaped resonant rod 120 and the second sheet-shaped resonant rod 130). Conversely, the shorter the distance D2 between the connecting rib 150 and the bottom plate 114 in the third direction K3, the greater the amount of the capacitive coupling between the first sheet-shaped resonant rod 120 and the second sheet-shaped resonant rod 130 (i.e., the smaller the amount of the inductive coupling between the first sheet-shaped resonant rod 120 and the second sheet-shaped resonant rod 130).

It can be seen from the above that the connecting rib 150 is used to enhance the inductive coupling between the first sheet-shaped resonant rod 120 and the second sheet-shaped resonant rod 130, so as to reduce the capacitive coupling between the first sheet-shaped resonant rod 120 and the second sheet-shaped resonant rod 130. The amount of the capacitive coupling between the first sheet-shaped resonant rod 120 and the second sheet-shaped resonant rod 130 can be adjusted by the arrangement of the connecting rib 150, so that the cavity filter 100 has stronger operability.

Figure 6:
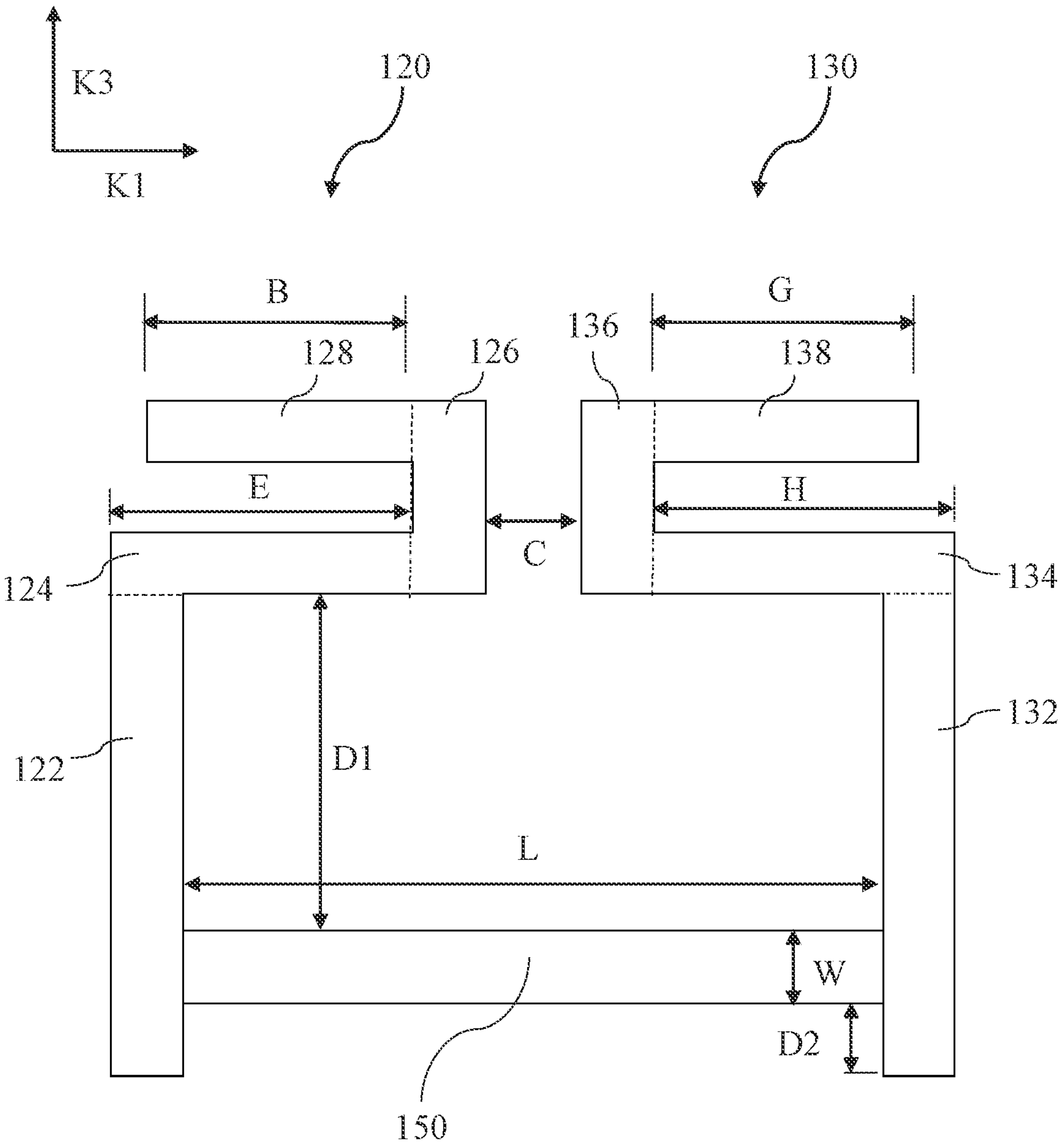
FIG. 6 is a combined view of an embodiment of the first sheet-shaped resonant rod, the second sheet-shaped resonant rod and the connecting rib of FIG. 1.

In an embodiment, please refer to FIG. 6, which is a combined view of an embodiment of the first sheet-shaped resonant rod, the second sheet-shaped resonant rod and the connecting rib of FIG. 1. As shown in FIG. 6, the first sheet-shaped resonant rod 120 may further comprise a first branch section 126 extending from one end of the first extension section 124 close to the second extension section 134. The second sheet-shaped resonant rod 130 may further comprise a third branch section 136 extending from one end of the second extension section 134 close to the first extension section 124. The first branch section 126 and the third branch section 136 are parallel to each other.

In an embodiment, the first branch section 126 extends in a direction away from the first upright section 122, and the third branch section 136 extends in a direction away from the second upright section 132.

In an embodiment, the first sheet-shaped resonant rod 120 may further comprise a second branch section 128 extending from one end of the first branch section 126 away from the first extension section 124, and the second sheet-shaped resonant rod 130 may further comprise a fourth branch section 138 extending from one end of the third branch section 136 away from the second extension 134, the first branch section 126 and the third branch section 136 are parallel to the first upright section 122 and the second upright section 132, and the second branch section 128 and the fourth branch section 138 are parallel to the first extension section 124 and the second extension section 134.

In one example, the length B of the second branch section 128 is less than the length E of the first extension section 124, and the length G of the fourth branch section 138 is less than the length H of the second extension section 134, so that the resonant frequency of the first sheet-shaped resonant rod 120 becomes lower, and the resonant frequency of the second sheet-shaped resonant rod 130 becomes lower. In another example, the length B of the second branch section 128 is greater than the length E of the first extension section 124, and the length G of the fourth branch section 138 is greater than the length H of the second extension section 134, so that the resonant frequency of the first sheet-shaped resonant rod 120 becomes higher, the resonant frequency of the second sheet-shaped resonant rod 130 becomes higher. In other words, the resonant frequency of the first sheet-shaped resonant rod 120 can be adjusted through different lengths B of the second branch section 128 and different lengths E of the first extension section 124, and the resonant frequency of the second sheet-shaped resonant rod 130 can be adjusted through different lengths G of the fourth branch section 138 and different lengths H of the second extension section 134. Therefore, the first sheet-shaped resonant rod 120 and the second sheet-shaped resonant rod 130 with different resonant frequencies can be designed according to actual requirements.

Figure 7:
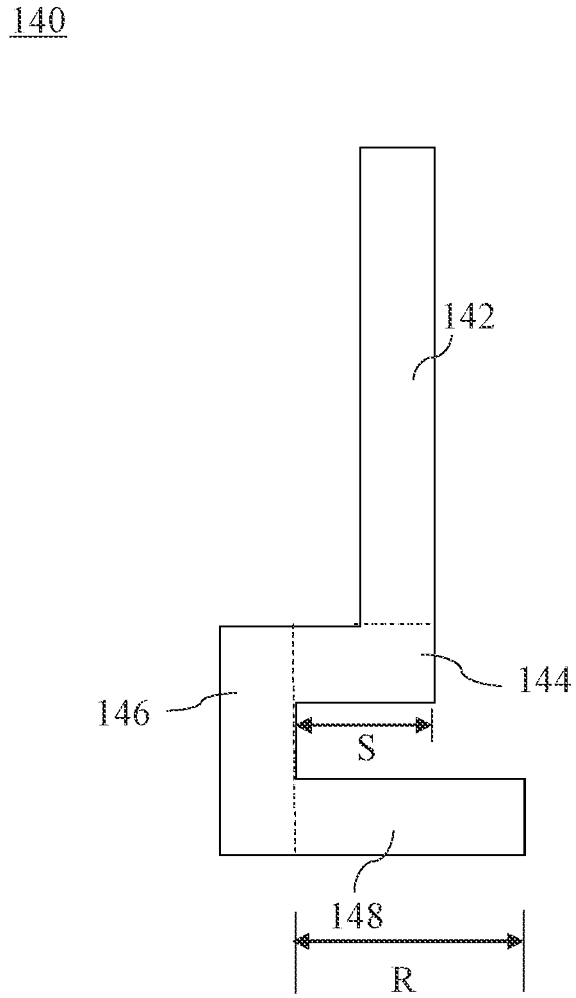
FIG. 7 is a schematic structural diagram of an embodiment of the third sheet-shaped resonant rod of FIG. 1.

In an embodiment, please refer to FIG. 7, which is a schematic structural diagram of an embodiment of the third sheet-shaped resonant rod of FIG. 1. As shown in FIG. 7, the third sheet-shaped resonant rod 140 may comprise a third upright section 142, a third extension section 144 extending from one side of the third upright section 142, a fifth branch section 146 extending from one the third extension section 144 in a direction away from the third upright section 142, and a sixth branch section 148 extending from one end of the fifth branch section 146 away from the third extension section 144, wherein the sixth branch section 148 and the third extension section 144 are parallel to each other.

In one example, the length R of the sixth branch section 148 is greater than the length S of the third extension section 144, so that the resonant frequency of the third sheet-shaped resonant rod 140 becomes higher. In another example, the length R of the sixth branch section 148 is less than the length S of the third extension section 144, so that the resonant frequency of the third sheet-shaped resonant rod 140 becomes lower. That is to say, the resonant frequency of the third sheet-shaped resonant rod 140 can be adjusted through different lengths R of the sixth branch section 148 and different lengths S of the third extension section 144. Therefore, the third sheet-shaped resonant rod 140 with different resonant frequencies can be designed according to actual requirements.

Figure 8:
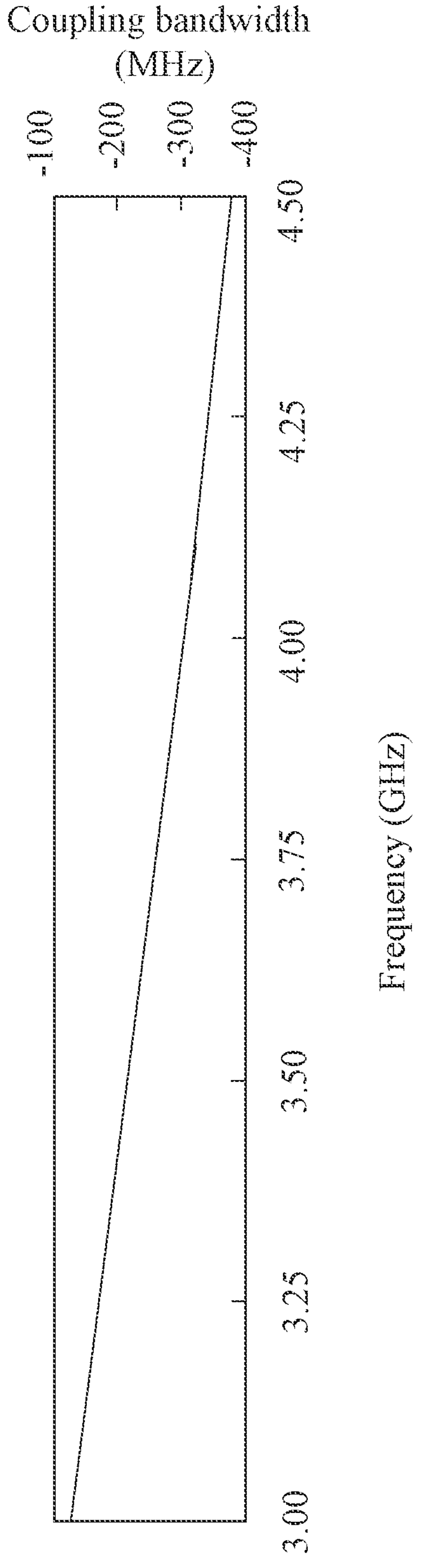
FIG. 8 is a simulation curve of the coupling bandwidth between the first sheet-shaped resonant rod and the third sheet-shaped resonant rod of FIG. 1 varying with working frequencies.
Figure 9:
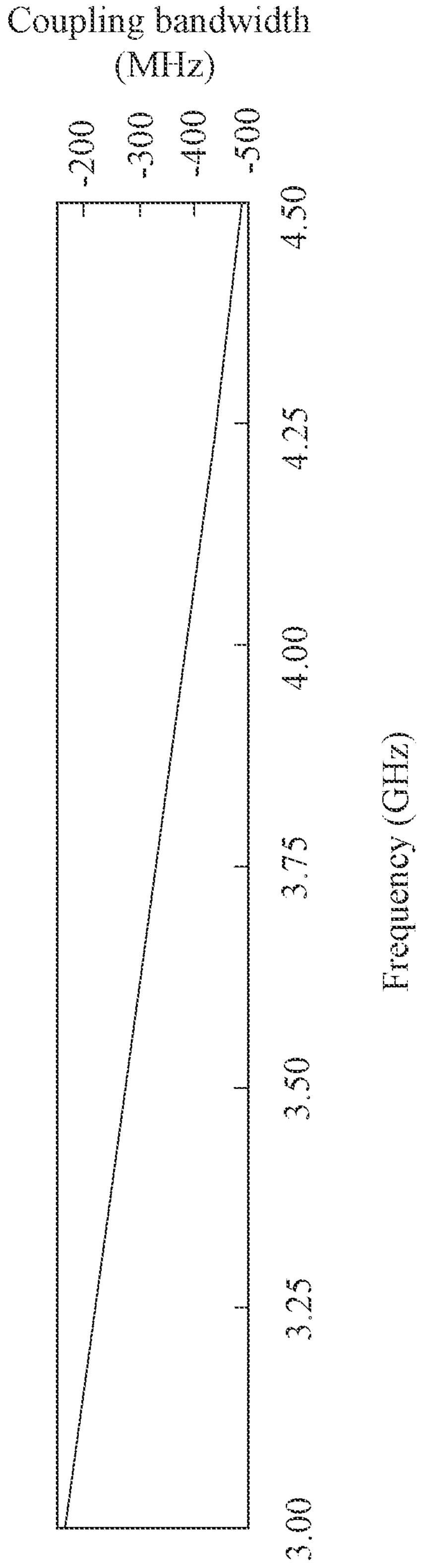
FIG. 9 is a simulation curve of the coupling bandwidth between the third sheet-shaped resonant rod and the second sheet-shaped resonant rod of FIG. 1 varying with working frequencies.
Figure 10:
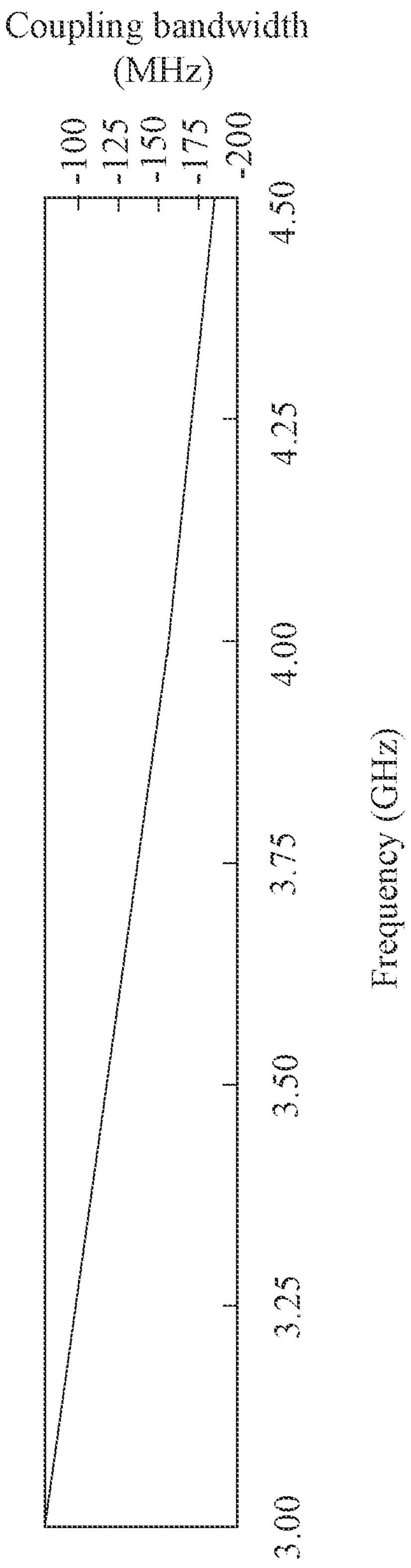
FIG. 10 is a simulation curve of the coupling bandwidth between the first sheet-shaped resonant rod and the second sheet-shaped resonant rod of FIG. 1 varying with working frequencies.

Please refer to FIGS. 8 to 10, wherein FIG. 8 is a simulation curve of the coupling bandwidth between the first sheet-shaped resonant rod and the third sheet-shaped resonant rod of FIG. 1 varying with working frequencies, FIG. 9 is a simulation curve of the coupling bandwidth between the third sheet-shaped resonant rod and the second sheet-shaped resonant rod of FIG. 1 varying with working frequencies, and FIG. 10 is a simulation curve of the coupling bandwidth between the first sheet-shaped resonant rod and the second sheet-shaped resonant rod of FIG. 1 varying with working frequencies. In FIGS. 8 to 10, the horizontal axis represents the frequency in gigahertz (GHz), and the vertical axis represents the coupling bandwidth in megahertz (MHz). As shown in FIGS. 8 to 10, the capacitive coupling (i.e., the negative coupling) is formed between the first sheet-shaped resonant rod 120 and the second sheet-shaped resonant rod 130, between the second sheet-shaped resonant rod 130 and the third sheet-shaped resonant rod 140, and between the first sheet-shaped resonant rod 120 and the third sheet-shaped resonant rod 140. According to the microwave transmission characteristics and the cross coupling theory, it can be calculated based on the simulation results of FIGS. 8 to 10 that the phase difference between the phase of the signal in the transmission channel between the first sheet-shaped resonant rod 120 and the second sheet-shaped resonant rod 130 and the phase of the signal in the transmission path from the first sheet-shaped resonant rod 120 to the second sheet-shaped resonant rod 130 via the third sheet-shaped resonant rod 140 is 180 degrees. Therefore, the cavity filter 100 can generate the transmission zero on the low-frequency side of the passband.

In summary, in the cavity filter of the embodiment of the present disclosure, the first extension section of the first sheet-shaped resonant rod and the second extension section of the second sheet-shaped resonant rod are opposite to each other, so that the capacitive coupling is formed between the first sheet-shaped resonant rod and the second sheet-shaped resonant rod (that is, the capacitive coupling can be realized without the flying rod). The capacitive coupling is formed between the first sheet-shaped resonant rod and the second sheet-shaped resonant rod, and the capacitive coupling or the inductive coupling is formed between the second sheet-shaped resonant rod and the third sheet-shaped resonant rod and between the first sheet-shaped resonant rod and the third sheet-shaped resonant rod, so that the symmetrical transmission zero is generated (that is, the transmission zero is generated on the low-frequency side of the passband). In addition, the cavity filter has the advantages of good stability, good consistency, simple manufacturing process, easy assembly, and low cost based on the design of the overall simple structure.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A cavity filter, comprising:

a housing having an accommodating cavity;

a first sheet-shaped resonant rod disposed in the accommodating cavity and comprising a first upright section and a first extension section extending from one side of the first upright section, wherein one end of the first upright section away from the first extension section is connected to the housing;

a second sheet-shaped resonant rod disposed in the accommodating cavity and comprising a second upright section and a second extension section extending from one side of the second upright section, wherein one end of the second upright section away from the second extension section is connected to the housing, and the first extension section and the second extension section extend toward each other; and a third sheet-shaped resonant rod disposed in the accommodating cavity and connected to the housing;

wherein capacitive coupling is formed between the first sheet-shaped resonant rod and the second sheet-shaped resonant rod, and capacitive coupling or inductive coupling is formed between the second sheet-shaped resonant rod and the third sheet-shaped resonant rod and between the first sheet-shaped resonant rod and the third sheet-shaped resonant rod.

2. The cavity filter according to claim 1, wherein the first sheet-shaped resonant rod and the second sheet-shaped resonant rod are spaced apart from each other in a first direction, the third sheet-shaped resonant rod is disposed between the first sheet-shaped resonant rod and the second sheet-shaped resonant rod in the first direction, and the third sheet-shaped resonant rod is spaced apart from the first sheet-shaped resonant rod and the second sheet-shaped resonant rod in a second direction perpendicular to the first direction.

3. The cavity filter according to claim 2, wherein, the third sheet-shaped resonant rod and the first sheet-shaped resonant rod partially overlap in the second direction, or the third sheet-shaped resonant rod and the second sheet-shaped resonant rod partially overlap in the second direction.

4. The cavity filter according to claim 1, wherein a separation distance between the first extension section and the second extension section corresponds to an amount of the capacitive coupling between the first sheet-shaped resonant rod and the second sheet-shaped resonant rod; and the shorter the separation distance, the greater the amount of the capacitive coupling between the first sheet-shaped resonant rod and the second sheet-shaped resonant rod.

5. The cavity filter according to claim 1, wherein the first sheet-shaped resonant rod, the second sheet-shaped resonant rod and the third sheet-shaped resonant rod are all sheets with metal surfaces or metal sheets.

6. The cavity filter according to claim 1, further comprising a connecting rib, wherein the connecting rib connects the first upright section and the second upright section in a first direction, wherein the connecting rib is parallel to the first extension section and the second extension section, and the connecting rib is spaced apart from the first extension section and the second extension section in a third direction perpendicular to the first direction.

7. The cavity filter according to claim 6, wherein the connecting rib has a length in the first direction, a thickness in the third direction, and a width in a second direction perpendicular to the first direction and the third direction; the length, the thickness, and the width correspond to an amount of the capacitive coupling between the first sheet-shaped resonant rod and the second sheet-shaped resonant rod; and the longer the length, the thicker the thickness and/or the greater the width, the smaller the amount of the capacitive coupling between the first sheet-shaped resonant rod and the second sheet-shaped resonant rod.

8. The cavity filter according to claim 7, wherein a separation distance between the connecting rib and the first extension section or the second extension section in the third direction corresponds to the amount of the capacitive coupling between the first sheet-shaped resonant rod and the second sheet-shaped resonant rod; and the shorter the separation distance, the smaller the amount of the capacitive coupling between the first sheet-shaped resonant rod and the second sheet-shaped resonant rod.

9. The cavity filter according to claim 6, wherein the first sheet-shaped resonant rod, the second sheet-shaped resonant rod and the connecting rib are integrally formed.

10. The cavity filter according to claim 1, wherein the housing further comprises a bottom plate portion, a side wall portion, and a cover plate portion, the side wall portion is circumferentially connected to the bottom plate portion, the side wall portion and the bottom plate portion form the accommodating cavity and an opening, one side surface of the cover plate portion covers the opening, the first sheet-shaped resonant rod and the second sheet-shaped resonant rod are connected to the bottom plate portion, and the third sheet-shaped resonant rod is connected to the bottom plate portion.

11. The cavity filter according to claim 1, wherein the housing further comprises a bottom plate portion, a side wall portion, and a cover plate portion, the side wall portion is circumferentially connected to the bottom plate portion, the side wall portion and the bottom plate portion form the accommodating cavity and an opening, one side surface of the cover plate portion covers the opening, the first sheet-shaped resonant rod and the second sheet-shaped resonant rod are connected to the bottom plate portion, and the third sheet-shaped resonant rod is connected to the cover plate portion.

12. The cavity filter according to claim 1, wherein the first sheet-shaped resonator rod further comprises a first branch section extending from one end of the first extension section close to the second extension section, the second sheet-shaped resonant rod further comprises a third branch section extending from one end of the second extension section close to the first extension section, and the first branch section is parallel to the third branch section.

13. The cavity filter according to claim 12, wherein the first sheet-shaped resonator rod further comprises a second branch section extending from one end of the first branch section away from the first extension section, the second sheet-shaped resonant rod further comprises a fourth branch section extending from one end of the third branch section away from the second extension section, the first branch section and the third branch section are parallel to the first upright section and the second upright section, and the second branch section and the fourth branch section are parallel to the first extension section and the second extension section.

14. The cavity filter according to claim 13, wherein a length of the second branch section is less than a length of the first extension, a length of the fourth branch section is less than a length of the second extension section; or, the length of the second branch section is greater than the length of the first extension section, and the length of the fourth branch section is greater than the length of the second extension section.

15. The cavity filter according to claim 12, wherein the first branch section extends in a direction away from the first upright section, and the third branch section extends in a direction away from the second upright section.

* * * * *